United States Patent
Raw

(10) Patent No.: US 7,552,421 B1
(45) Date of Patent: Jun. 23, 2009

(54) METHOD FOR ADDING COMMENTS TO DELETED CODE

(75) Inventor: Lucy A. Raw, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,795

(22) Filed: Apr. 7, 2008

(51) Int. Cl.
*G06F 9/44* (2006.01)

(52) U.S. Cl. .................. 717/122; 717/100

(58) Field of Classification Search .......... 717/100, 717/101, 122
See application file for complete search history.

(56) References Cited

U.S. PATENT DOCUMENTS

| | | | |
|---|---|---|---|
| 5,956,732 A | 9/1999 | Tsuchida | |
| 6,275,223 B1 * | 8/2001 | Hughes | 715/751 |
| 7,234,131 B1 * | 6/2007 | Speyrer et al. | 717/101 |
| 7,277,901 B2 | 10/2007 | Parker et al. | |
| 7,437,712 B1 * | 10/2008 | Brown et al. | 717/122 |
| 2004/0249871 A1 * | 12/2004 | Bazoon | 707/206 |
| 2005/0005258 A1 | 1/2005 | Bhogal et al. | |
| 2005/0060692 A1 | 3/2005 | Mansourov | |
| 2005/0160356 A1 * | 7/2005 | Albornoz et al. | 715/512 |
| 2005/0183011 A1 | 8/2005 | Keohane et al. | |
| 2006/0095469 A1 * | 5/2006 | Willy et al. | 707/104.1 |
| 2007/0240101 A1 * | 10/2007 | Wilson | 717/104 |
| 2007/0245304 A1 | 10/2007 | Curran | |

* cited by examiner

*Primary Examiner*—Lewis A. Bullock, Jr.
*Assistant Examiner*—Jue S Wang
(74) *Attorney, Agent, or Firm*—Suiter Swantz pc llo

(57) ABSTRACT

A method for adding comments to deleted code includes maintaining a first version of a file in a code repository, providing the first version of a file available to a first user, receiving a second version of the file, the second version being an updated version of the first version of a file, the second version of the file including at least one segment of deleted code and at least one comment regarding the at least one segment of deleted code, simultaneously maintaining the second version of the file and the first version of the file in the code repository, providing the second version of the file to a second user, providing a comparison tool for comparing the first version of the file to the second version of the file, and receiving a modification approval indication including an approval of deletion of the at least one deleted segment.

1 Claim, 2 Drawing Sheets

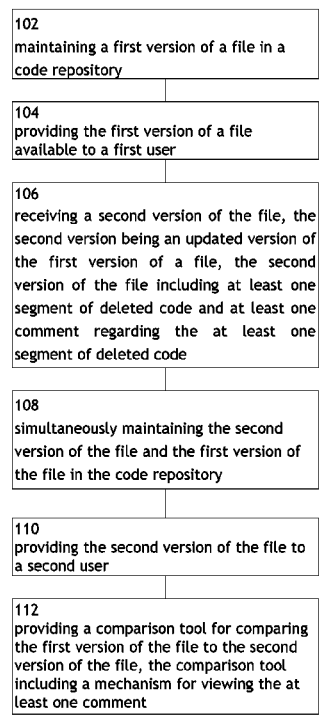

102
maintaining a first version of a file in a code repository

104
providing the first version of a file available to a first user

106
receiving a second version of the file, the second version being an updated version of the first version of a file, the second version of the file including at least one segment of deleted code and at least one comment regarding the at least one segment of deleted code

108
simultaneously maintaining the second version of the file and the first version of the file in the code repository

110
providing the second version of the file to a second user

112
providing a comparison tool for comparing the first version of the file to the second version of the file, the comparison tool including a mechanism for viewing the at least one comment

114
receiving a modification approval indication, the modification approval indication including an approval of deletion of the at least one deleted segment

116
providing a third version of the file to a third user subsequent to providing the second version of the file to the second user, the providing the third version of the file to the third user including removing the at least one comment from the second version of the file

118
upon creation of the third version of the file, simultaneously maintaining the third version of the file, the second version of the file, and the first version of the file in the code repository

FIG. 1B

METHOD FOR ADDING COMMENTS TO DELETED CODE

TECHNICAL FIELD

The present disclosure generally relates to the field of computer programming, and more particularly to a method for adding comments to deleted code.

BACKGROUND

Updating a piece of code usually involves writing new code, and it is usual to comment this code to describe the function it is providing. Typically, this code will be reviewed by comparing the new file with the old file. Where code has changed, the reviewer uses the comments to aid understanding of the changes. In some instance, code is deleted.

SUMMARY

A method for adding comments to deleted code includes, but is not limited to: maintaining a first version of a file in a code repository; providing the first version of a file available to a first user; receiving a second version of the file, the second version being an updated version of the first version of a file, the second version of the file including at least one segment of deleted code and at least one comment regarding the at least one segment of deleted code; simultaneously maintaining the second version of the file and the first version of the file in the code repository; providing the second version of the file to a second user; providing a comparison tool for comparing the first version of the file to the second version of the file, the comparison tool including a mechanism for viewing the at least one comment; receiving a modification approval indication, the modification approval indication including an approval of deletion of the at least one deleted segment; providing a third version of the file to a third user subsequent to providing the second version of the file to the second user, the providing the third version of the file to the third user including removing the at least one comment from the second version of the file; and, upon creation of the third version of the file, simultaneously maintaining the third version of the file, the second version of the file, and the first version of the file in the code repository.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1 is a flow diagram of a method for adding comments to deleted code.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In one embodiment, Method 100 may be a computer program product for adding comments to deleted code, the computer program product comprising a computer useable storage medium having computer useable program code stored thereon tangibly embodied therewith. Examples of computer useable storage medium having computer useable program code stored thereon include computer readable storage devices such as a recordable type medium such as a floppy disk, a hard disk drive, a Compact Disc (CD), a Digital Video Disk (DVD), a digital tape, a computer memory, conventional computer system RAM (random access memory), ROM (read only memory), EPROM (erasable, programmable ROM), EEPROM (electrically erasable, programmable ROM), flash memory, and magnetic or optical disks or tapes.

Method 100 may include maintaining a first version of a file in a code repository 102. Code repository may maintain at least a version of the file including a comment and a subsequent version not including the comment. Method 100 may also include providing the first version of a file available to a first user 104. Method 100 may display actual values when the file is extracted and provided to the first user. Therefore, method 100 may be operable for any type of code. For example, the following file containing code may be stored in a code repository and may be provided to a first user:

```
# this subroutine doubles the input
sub do_that{
    my $input = shift;
    my $output = $input + $input;
    return $output;
}
...
# main
my (@objects) = create_objects( );
my $resultA = do_this($object[0]);
my $resultB = do_this($object[1]);
my $resultC = do_that($object[1]);
my $resultD = do_this($object[3]);
```

In the example above, a do_that subroutine may be utilized in several places. The code may be modified to require do_that only, for example, in the segment above, therefore eliminating the need for a do_that subroutine. As the do_that subroutine may be one of a plurality of code modifications across a large file, the reason for deleting the subroutine may not be immediately obvious. A comment regarding a segment of deleted code may be indicated by inserting a deletion signifier (e.g., a %D% symbol) within the deleted line deleted. For instance, method 100 may provide a file in a format such as:

```
# %D% Removed subroutine do_that
because it was only called in Line 343
where the value is now doubled.
...
# main
my (@objects) = create_objects( );
my $resultA = do_this($object[0]);
my $resultB = do_this($object[1]);
my $resultC = $object[1] + $object[1];
my $resultD = do_this($object[3]);
```

Method 100 may include receiving a second version of the file, the second version being an updated version of the first version of a file, the second version of the file including at least one segment of deleted code and at least one comment regarding the at least one segment of deleted code 106, as indicated above.

Method 100 may include simultaneously maintaining the second version of the file and the first version of the file in the code repository 108. Method 100 may also include providing the second version of the file to a second user 110. Second user and first user may be a single user viewing the file during subsequent intervals, or multiple users viewing the files at subsequent intervals.

Method 100 may include providing a comparison tool for comparing the first version of the file to the second version of the file, the comparison tool including a mechanism for viewing the at least one comment 112. A comment provided to the second user, such as a reviewer, may be utilized to determine that the modification has been implemented in at least one other appropriate location within the file. For instance, the reviewer may verify that Line 343 has been updated accordingly. Method 100 may provide an approval mechanism whereby code updates may be approved. Method 100 may also include receiving a modification approval indication, the modification approval indication including an approval of deletion of the at least one deleted segment 114.

Method 100 may include providing a third version of the file to a third user subsequent to providing the second version of the file to the second user 116, the providing a third version of the file to a third user including removing the at least one comment from the second version of the file 116. Prior to providing the third version of the file, the code repository may edit the immediately prior version (e.g., the second version) of the file to remove the at least one comment. For example, the file may be parsed, and a block of text that has been marked in a specific way may be removed. Code repository may recognize a comment to be deleted by the comment deletion signifier (e.g., the %D% symbol) within the comment to be deleted. As stated previously, when the second version (e.g., the version modified by the first user) of the code is provided to a second user, for example, for review, a line including a deletion signifier may be included in the file and may viewable to the user. If a file is requested for further updates, a comment containing the deletion signifier may be deleted prior to providing the updated version of the file to the third user. In continuing the example above, the code may be viewable to the third user as:

```
...
# main
my (@objects) = create_objects( );
my $resultA = do_this($object[0]);
my $resultB = do_this($object[1]);
my $resultC = $object[1] + $object[1];
my $resultD = do_this($object[3]);
```

Method 100 may include simultaneously maintaining at least the third version of the file, the second version of the file, and the first version of the file in the code repository upon creation of the third version of the file 118. Method 100 may maintain the comment deletion signifier during file extraction in a second version of the file, while deleting the comment in the third version of the file. Third user, second user, and first user may be a single user viewing the file during subsequent intervals, or multiple users viewing the files at subsequent intervals.

Method 100 may further include recognizing an additional symbol representing a number of allowable updates. For instance, method may receive a comment viewing limitation, for instance, specifying a number of releases of a comment. Using the example above, a user may indicate a line using %D3% to indicate that the comment may be deleted prior to 3 updates to the file. When a file is viewed at a subsequent interval, for instance, to receive further updates, a line containing the comment viewing limitation may be updated such that the limitation is reduced by an increment (e.g., one update) until %D1% is reached. When a comment viewing limitation reaches zero, method 100 may remove the full comment.

This method 100 may also specify that a comment deletion after a time period. For example, method 100 may indicate that a comment should be deleted after a period of time such as a year. When maintained within the code repository, the code repository tool may determine the comment expiration date and provide an expiration date stamp for the file. Each time the code is provided to a user, the code repository tool compares the expiration date stamp with the current date stamp.

Method 100 may maintain the comment in a code repository for reference. For example, a future developer may attempt to revert the code to a previous version. The comment may reside in the code repository and may be provided to explain why the code was deleted in a prior version and determine whether to revert to a previous version.

Method 100 may also be implemented as a separate file parser or as part of a code review tool. File parser may produce additional revisions which may be maintained in the code repository.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A computer program product for adding comments to deleted code, the computer program product comprising:
 a computer useable storage medium having computer useable program code stored thereon tangibly embodied therewith, the computer useable program code comprising:
 computer useable program code configured to maintaining a first version of a file in a code repository;
 computer useable program code configured to provide the first version of a file available to a first user;
 computer useable program code configured to receive a second version of the file, the second version being an updated version of the first version of a file, the second version of the file including at least one segment of deleted code and at least one comment regarding the at least one segment of deleted code;
 computer useable program code configured to receive a comment viewing limitation counter embedded with the at least one comment;

computer useable program code configured to simultaneously maintain the second version of the file and the first version of the file in the code repository;

computer useable program code configured to provide the second version of the file to a second user;

computer useable program code configured to provide a comparison tool for comparing the first version of the file to the second version of the file, the comparison tool including a mechanism for viewing the at least one comment;

computer useable program code configured to receive a modification approval indication, the modification approval indication including an approval of deletion of the at least one deleted segment;

computer useable program code configured to provide a third version of the file to a third user subsequent to providing the second version of the file to the second user, the providing the third version of the file to the third user including removing the at least one comment from the second version of the file;

upon creation of the third version of the file, computer useable program code configured to simultaneously maintain the third version of the file, the second version of the file, and the first version of the file in the code repository;

computer useable program code configured to decrement the comment viewing limitation counter upon detection of an update of the file, the computer useable program code being further configured to decrement the comment viewing limitation counter until a minimum decrement value is reached; and computer useable program code configured to delete the at least one comment associated with the comment viewing limitation counter upon the comment viewing limitation counter reaching zero.

* * * * *